United States Patent Office 3,649,594
Patented Mar. 14, 1972

3,649,594
STABILIZATION OF URETHANE POLYMERS
Hiroshi Ono, Kotaro Watanabe, and Hajime Suzuki, Ootsu, Japan, assignors to Toyo Boseki Kabushiki Kaisha, Osaka, Japan
No Drawing. Filed Oct. 11, 1968, Ser. No. 766,968
Claims priority, application Japan, Oct. 24, 1967, 42/68,691
Int. Cl. C08g 51/60
U.S. Cl. 260—45.9 R          10 Claims

ABSTRACT OF THE DISCLOSURE

Urethane polymers are stabilized against discoloration by combustion gases commonly found in the atmosphere by the addition of a compound having at least one

linkage in the molecule, one to three radicals

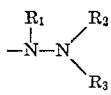

bonded to each

linkage and having no active radical which is capable of reacting with the radical

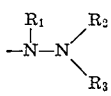

wherein X is S or O, $R_1$ is hydrogen or a monovalent aliphatic hydrocarbon radical having 1–7 carbon atoms, and each of $R_2$ and $R_3$ is hydrogen or a monovalent aliphatic, alicyclic or aromatic radical having 1–20 carbon atoms, or $R_2$ and $R_3$ together with the adjacent N atom form a closed ring.

---

This invention relates to a stabilized polyurethane composition and is more particularly to a urethane polymer composition highly resistant to discoloration by atmospheric conditions or combustion gases.

Generally, polymers based on isocyanates, or so-called urethane polymers, in the form, for example, spandex fibers, films, coatings and foam have a disadvantage that, when they are exposed to atmospheric conditions or combustion gases such as of hydrocarbons or nitrogen oxide gases, there is seen yellowing or burning.

The present invention is to overcome such disadvantages of urethane polymers and provide a stable urethane polymer composition.

It is known to add antioxidants, ultraviolet absorbers or combustion gas-discoloration inhibitors or combinations thereof to urethane polymers containing recurring urea linkage or urethane linkage in the molecule to improve their light-resistance. Generally, ultraviolet absorbers and antioxidants are used. However, most of the known stabilizers are not satisfactory enough in the resistance to gas-discoloration of polyurethane and can not satisfactorily inhibit the discoloration upon long exposure to combustion gaseous atmospheres or to light. Some of the conventional stabilizers spoil the other properties of the urethane polymer. Further, the stabilizing effect of known gas-discoloration inhibitors on the urethane polymers is influenced by the compatibility or affinity of the stabilizer with the polymer and also by the reactivity in the polymer.

We have found that when a compound (which will be briefly referred to as "compound A" hereinafter) which has at least one

bond in the molecule and in which there are 1 to 3 radicals of the formula

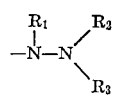

each bonded to a

bond and which has no such active radical which would react with the radical

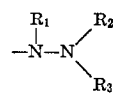

wherein X is O or S atom, $R_1$ is hydrogen or a monovalent hydrocarbon radical and each of $R_2$ and $R_3$ is hydrogen, a monovalent hydrocarbon radical, a monovalent radical consisting of hetero atom(s) or halogen atom(s) and a hydrocarbon, a bivalent hydrocarbon radical, a bivalent radical consisting of hetero atom(s) or halogen atoms(s) and a hydrocarbon, $R_2$ and $R_3$ may form a substituted or unsubstituted closed ring in conjunction with the adjacent N atom, is admixed with a urethane polymer, the gas-discoloration resistance is remarkably increased.

In the above mentioned compounds A, $R_1$, $R_2$ and $R_3$ are preferably as follows. Thus $R_1$ is preferably hydrogen or an alkyl, aryl or cycloalkyl radical having up to six (6) carbon atoms while this carbon atom number is not critical. Each of $R_2$ and $R_3$ is preferably hydrogen, an alkyl, aryl, cycloalkyl, alkylene, arylene or cycloalkylene radical substituted or not substituted with halogen, hydroxyl radical or nitro group or each of $R_2$ and $R_3$ is a radical forming a substituted or unsubstituted closed ring in conjunction with the adjacent N atom. The carbon atom number of each of $R_2$ and $R_3$ is up to 20 while this is not critical.

Preferable examples of the radical

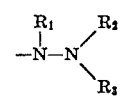

(referred to as "radical B" hereinafter) are as follows:

—NHNH₂, —NH—NHCH₃, —NH—NHC₂H₅
—NHNHC₃H₇, —NHNHC₄H₉, —NHNHC₅H₁₁
—NHNHC₆H₁₃, —NHNHC₈H₁₇, —NHNHC₁₂H₂₅
—NHNHC₁₆H₃₃, —NHNHCH₂CH=CH₂
—NHNHCH₂CH₂—OH, —N(CH₃)NHCH₃
—N(C₂H₅)NHC₂H₅

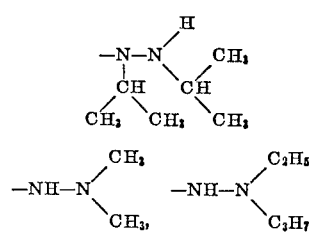

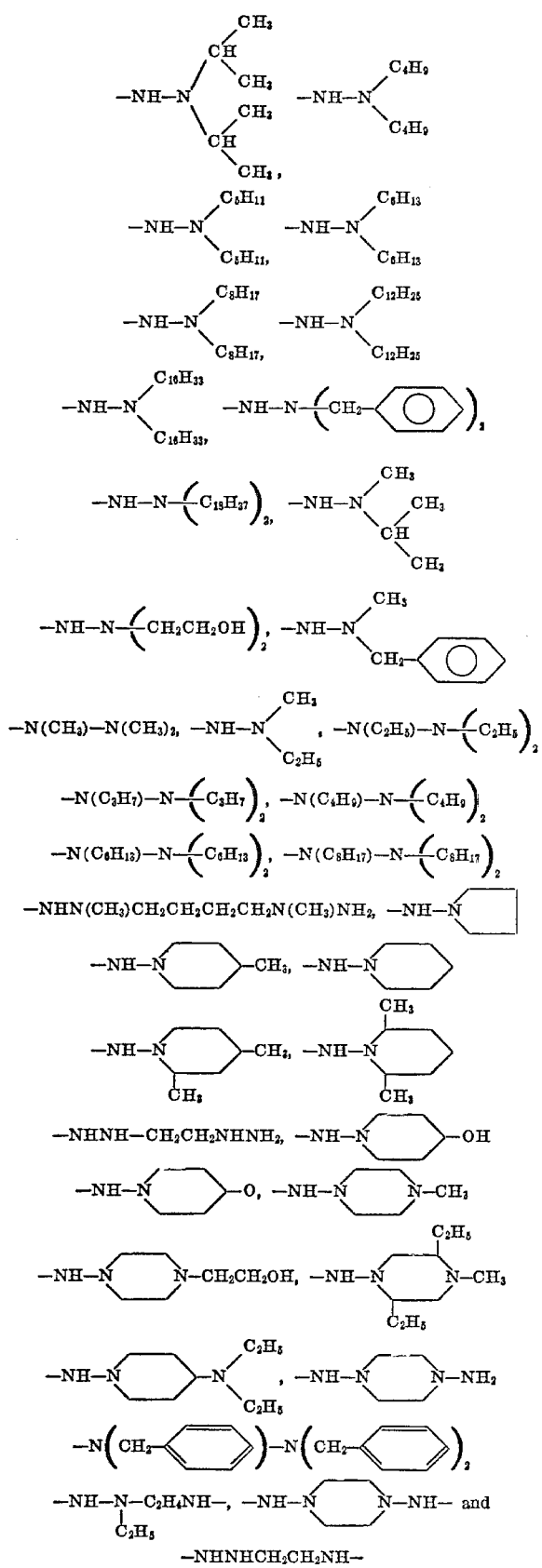

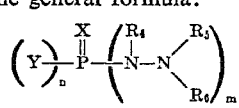

An example of the above mentioned compounds A is represented by the general formula:

wherein X is O or S atom, R₄ is hydrogen or a monovalent hydrocarbon radical, each of R₅ and R₆ is hydrogen, a monovalent hydrocarbon radical, a monovalent radical consisting of hetero atom(s) or halogen atoms(s) and a hydrocarbon, or a radical forming a substituted or unsubstituted closed ring in conjunction with the adjacent N atom, Y is an organic radical, n is 0, 1 or 2, m is 1, 2 or 3 and $n+m=3$.

This formula will be referred to as "the general formula C" hereinafter.

In the above general formula C, R₄, R₅ and R₆ are preferably as follows. Thus R₄ is preferably hydrogen or an alkyl, aryl or cycloalkyl radical having up to six (6) carbon atoms while this carbon atom number is not critical. Each of R₅ and R₆ is preferably hydrogen, an alkyl, aryl or cycloalkyl radical; an alkyl, aryl or cycloalkyl radical having hetero atom(s) in the chain. These radicals may be substituted with halogen, hydroxyl, or nitro group. Each of R₅ and R₆ may also be a radical forming a substituted or unsubstituted closed ring in conjunction with the adjacent N atom. The carbon atom number in each of R₅ and R₆ preferably is no more than 20 while not critical. Y is an organic radical or preferably a hydrocarbon radical or a radical consisting of hetero atom(s) or halogen atom(s) and a hydrocarbon. For example, Y may also be represented by —Z, —OZ or —SZ, wherein Z is a monovalent aliphatic, aromatic or alicyclic radical; an aliphatic, aromatic or alicyclic radical having hetero atom(s) in the chain; and these may be substituted with halogen(s), hydroxyl radical(s) or nitro radical(s). As another example of the radical Y, there is a radical represented by $$-N\diagdown_{Z_2}^{Z_1}$$

wherein each of Z₁ and Z₂ may be the same radical as the above mentioned Z, either one of Z₁ and Z₂ may be a hydrogen atom and further each of Z₁ and Z₂ may be a radical forming a substituted or unsubstituted closed ring in conjunction with the adjacent N atom.

Examples of the radical Y are as follows:

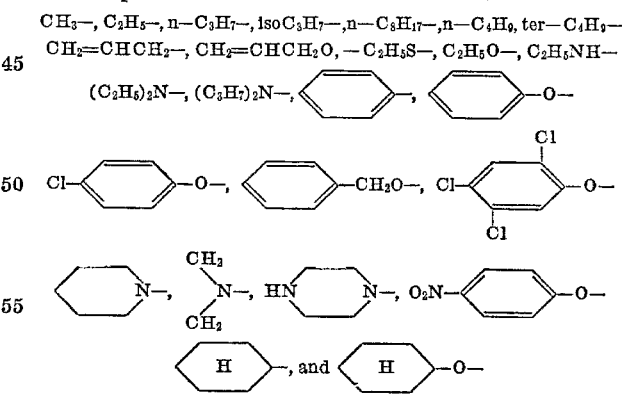

Another example of the above mentioned compound A may be represented by the formula

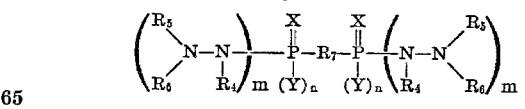

wherein X, Y, R₄, R₅ and R₆ are as defined before in respect of the general formula C, R₇ is a bivalent organic radical, n is 0 or 1, m is 1 or 2 and $n+m$ is 2. The above formula will be referred to as the "general formula D" hereinafter.

In the above general formula D, R₇ is a bivalent organic radical, preferably a hydrocarbon radical or a radical consisting of hetero atom(s) or halogen atom(s) and a hydrocarbon. For example, it may also be represented by —Z₃—, —NHZ₃NH—, —OZ₃O— or —SZ₃S—, wherein $Z_3$ is a bivalent aliphatic, aromatic or alicyclic radical; a bivalent aliphatic, aromatic or alicyclic radical having hetero atom(s) in the chain. These may be substituted with halogen(s), hydroxyl radical(s) or nitro radical(s). Further, $R_7$ may be represented by

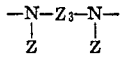

wherein $Z_3$ is as defined above and Z is as defined before in respect of the general formula C. Further, $R_7$ may also be

Examples of the radical $R_7$ in the above mentioned general formula D are as follows:

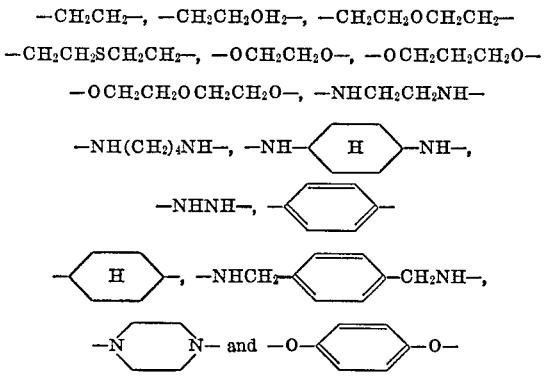

The stabilizers so far mentioned are more or less soluble. However, if desired, some of them may be converted into a high molecular weight compound by subjecting it to polymerization utilizing vinyl radicals or the like. Further, when the stabilizer has a reactive radical, it can be made to react to be bonded to the terminals of the polyurethane molecule.

Still another example of the above mentioned compound A is represented by the formula:

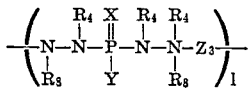

wherein Y, $R_4$ and $Z_3$ are as defined before, $R_8$ is the same as $R_4$ in the general formula C, $l$ is a positive integer, preferably 2 to 100. This formula will be referred to as the "general formula E" hereinafter.

A further example of the above mentioned compound A is represented by the formula

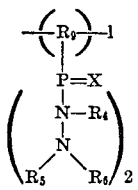

wherein $R_9$ is a trivalent organic radical, X, $R_4$, $R_5$ and $R_6$ are as defined before and $l$ is a positive integer of 2 or greater. This formula will be referred to as the "general formula F" hereinafter.

In the above general formula F, $R_9$ is a trivalent organic radical. For example, it may be represented by

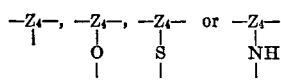

wherein $Z_4$ is a trivalent aliphatic, aromatic or alicyclic radical; or an aliphatic, aromatic or alicyclic radical having hetero atom(s) in the chain. These may be substituted with halogen. The hetero atom bonded to $Z_4$ is connected to the phosphorus atom in the general formula F.

Examples of the radical $R_9$ are as follows:

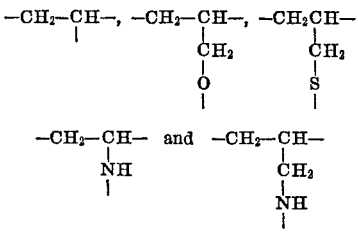

More particular examples of the compound A to be used in the present invention are as follows:

| | Abbreviation |
|---|---|
| ⟨phenyl⟩-P(=O)[NHN(CH₃)₂]₂ | a-1 |
| ⟨phenyl⟩-P(=S)[NHN(CH₃)₂]₂ | a-2 |
| ⟨phenyl⟩-P(=O)[NHN(C₂H₅)₂]₂ | a-3 |
| ⟨phenyl⟩-P(=S)[NHN(C₂H₅)₂]₂ | a-4 |
| ⟨phenyl⟩-P(=O)[NHN(C₄H₉)₂]₂ | a-5 |
| ⟨phenyl⟩-P(=S)[NHN(C₄H₉)₂]₂ | a-6 |
| ⟨phenyl⟩-P(=O)[NHN(C₆H₁₃)₂]₂ | a-7 |
| ⟨phenyl⟩-P(=S)[NHN(C₆H₁₃)₂]₂ | a-8 |
| ⟨phenyl⟩-P(=S)[NHN(C₁₂H₂₅)₂]₂ | a-9 |
| ⟨phenyl⟩-P(=O)[NHN(C₁₈H₃₇)₂]₂ | a-10 |
| ⟨phenyl⟩-P(=S)[NHN(C₁₈H₃₇)₂]₂ | a-11 |
| ⟨phenyl⟩-P(=O)[NHN(CH₂⟨phenyl⟩)₂]₂ | a-12 |
| ⟨phenyl⟩-P(=S)[NHN(CH₂⟨phenyl⟩)₂]₂ | a-13 |
| ⟨phenyl⟩-P(=O)(NH-N⟨piperidino⟩)₂ | a-14 |
| ⟨phenyl⟩-P(=S)(NH-N⟨piperidino⟩)₂ | a-15 |
| ⟨phenyl⟩-P(=O)(NHN⟨pyrrolidino⟩)₂ | a-16 |
| ⟨phenyl⟩-P(=S)(NHN⟨pyrrolidino⟩)₂ | a-17 |

| Structure | Abbreviation |
|---|---|
| $CH_2=CHCH_2\overset{S}{\underset{\|}{P}}[NHN(CH_3)_2]_2$ | a-18 |
| $CH_2=CH\overset{S}{\underset{\|}{P}}[NHN(CH_3)_2]_2$ | a-19 |
| $C_8H_{17}\overset{S}{\underset{\|}{P}}[NHN(CH_3)_2]_2$ | a-20 |
| $CH_2=CHCH_2\overset{O}{\underset{\|}{P}}[NHN(CH_3)_2]_2$ | a-21 |
| $\langle H \rangle -\overset{S}{\underset{\|}{P}}[NHN(CH_3)_2]_2$ | a-22 |
| $\langle H \rangle -\overset{O}{\underset{\|}{P}}[NHN(CH_3)_2]_2$ | a-23 |
| $C_2H_5\overset{S}{\underset{\|}{P}}[NHN(CH_3)_2]_2$ | a-24 |
| $C_2H_5\overset{O}{\underset{\|}{P}}[NHN(CH_3)_2]_2$ | a-25 |
| $CH_3(CH_2)_5CH_2\overset{O}{\underset{\|}{P}}[NHN(CH_3)_2]_2$ | a-26 |
| $CH_3(CH_2)_5CH_2\overset{S}{\underset{\|}{P}}[NHN(CH_3)_2]_2$ | a-27 |
| $C_2H_5O\overset{O}{\underset{\|}{P}}[NHN(CH_3)_2]_2$ | a-28 |
| $C_2H_5O\overset{S}{\underset{\|}{P}}[NHN(CH_3)_2]_2$ | a-29 |
| $C_6H_{13}O\overset{O}{\underset{\|}{P}}[NHN(CH_3)_2]_2$ | a-30 |
| $C_6H_{13}O\overset{S}{\underset{\|}{P}}[NHN(CH_3)_2]_2$ | a-31 |
| $\langle \rangle -O-\overset{S}{\underset{\|}{P}}[NHN(CH_3)_2]_2$ | a-32 |
| $CH_2=CHCH_2O\overset{S}{\underset{\|}{P}}[NHN(CH_3)_2]_2$ | a-33 |
| $NO_2-\langle \rangle -O\overset{S}{\underset{\|}{P}}(NHNH-\langle \rangle)_2$ | a-34 |
| $CH_2=CHCH_2O\overset{S}{\underset{\|}{P}}[NHN(CH_3)_2]_2$ | a-35 |
| $\langle \rangle -CH_2O\overset{S}{\underset{\|}{P}}[NHN(CH_3)_2]_2$ | a-36 |
| $[(CH_3)_2NNH]_2\overset{S}{\underset{\|}{P}}OCH_2CH_2CH_2CH_2O\overset{S}{\underset{\|}{P}}[NHN(CH_3)_2]_2$ | a-37 |
| $C_4H_9NH\overset{S}{\underset{\|}{P}}[NHN(CH_3)_2]_2$ | a-38 |
| $C_4H_9NH\overset{O}{\underset{\|}{P}}[NHN(CH_3)_2]_2$ | a-39 |
| $CH_2=CHCH_2NH\overset{S}{\underset{\|}{P}}[NHN(CH_3)_2]_2$ | a-40 |
| $CH_2=CHCH_2NH\overset{O}{\underset{\|}{P}}[NHN(CH_3)_2]_2$ | a-41 |
| $\langle \rangle -CH_2NH\overset{S}{\underset{\|}{P}}[NHN(CH_3)_2]_2$ | a-42 |
| $\langle \rangle -CH_2NH\overset{O}{\underset{\|}{P}}[NHN(CH_3)_2]_2$ | a-43 |
| $(C_2H_5)_2N\overset{S}{\underset{\|}{P}}[NHN(CH_3)_2]_2$ | a-44 |
| $(C_2H_5)_2N\overset{O}{\underset{\|}{P}}[NHN(CH_3)_2]_2$ | a-45 |
| $(C_4H_9)_2N\overset{S}{\underset{\|}{P}}[NHN(CH_3)_2]_2$ | a-46 |
| $(C_2H_5)_2N\overset{O}{\underset{\|}{P}}(NHNH-\langle \rangle)_2$ | a-47 |
| $(C_4H_9)_2N\overset{O}{\underset{\|}{P}}[NHN(CH_3)_2]_2$ | a-48 |
| $\triangle N-\overset{S}{\underset{\|}{P}}[NHN(CH_3)_2]_2$ | a-49 |
| $\langle N \rangle -\overset{S}{\underset{\|}{P}}[NHN(CH_3)_2]_2$ | a-50 |
| $O\langle N \rangle -\overset{S}{\underset{\|}{P}}[NHN(CH_3)_2]_2$ | a-51 |
| $[(CH_3)_2NNH]_2\overset{S}{\underset{\|}{P}}N\langle \rangle N-\overset{S}{\underset{\|}{P}}[NHN(CH_3)_2]_2$ | a-52 |
| $C_2H_5S\overset{S}{\underset{\|}{P}}[NHN(CH_3)_2]_2$ | a-53 |
| $\overset{S}{\underset{\|}{P}}[NHN(CH_3)_2]_3$ | a-54 |
| $\overset{O}{\underset{\|}{P}}[NHN(CH_3)_2]_3$ | a-55 |
| $\overset{S}{\underset{\|}{P}}[NHN(C_4H_9)_2]_3$ | a-56 |
| $\overset{O}{\underset{\|}{P}}[NHN(C_4H_9)_2]_3$ | a-57 |
| $\overset{O}{\underset{\|}{P}}[NHN(C_4H_9)_2]_3$ | a-57 |
| $\overset{S}{\underset{\|}{P}}[NHN(C_6H_{13})_2]_3$ | a-58 |
| $\overset{O}{\underset{\|}{P}}[NHN(C_6H_{13})_2]_3$ | a-59 |
| $\overset{S}{\underset{\|}{P}}[NHN(C_{12}H_{25})_2]_3$ | a-60 |
| $\overset{S}{\underset{\|}{P}}(NHNHC_{16}H_{43})_3$ | a-61 |
| $\overset{O}{\underset{\|}{P}}[NHN(C_{16}H_{33})_2]_3$ | a-62 |
| $\overset{S}{\underset{\|}{P}}[NHN(CH_2-\langle \rangle)_2]_3$ | a-63 |
| $\overset{O}{\underset{\|}{P}}[NHN(CH_2-\langle \rangle)_2]_3$ | a-64 |
| $\overset{S}{\underset{\|}{P}}[NH-N\langle \rangle]_3$ | a-65 |
| $\overset{O}{\underset{\|}{P}}[NH-N\langle \rangle]_3$ | a-66 |

| | Abbreviation |
|---|---|
| 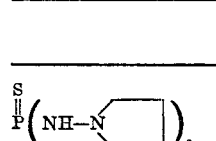 | a-67 |
| 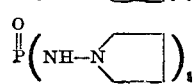 | a-68 |
| 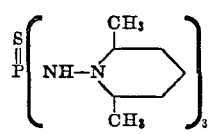 | a-69 |
| 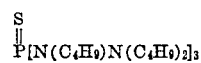 | a-70 |
| 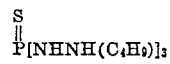 | a-71 |
| 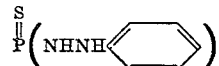 | a-72 |
| 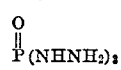 | a-73 |
| 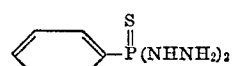 | a-74 |
| 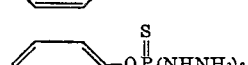 | a-75 |
| 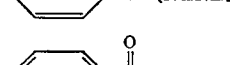 | a-76 |
| 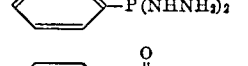 | a-77 |
| 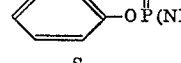 | a-78 |
| 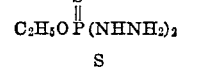 | a-79 |
| 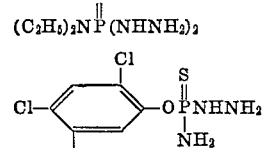 | a-80 |
| 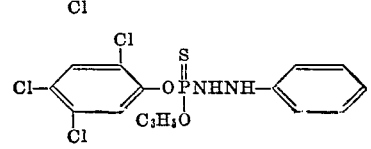 | a-81 |
| 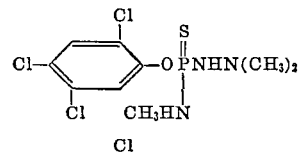 | a-82 |
| 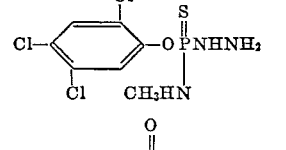 | a-83 |
| 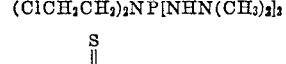 | a-84 |
| 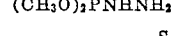 | a-85 |
| 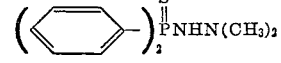 | a-86 |
| | Abbreviation |
|---|---|
| 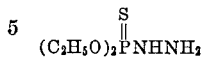 | a-87 |
| 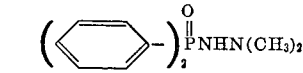 | a-88 |
| 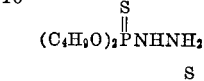 | a-89 |
| 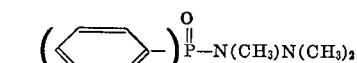 | a-90 |
| 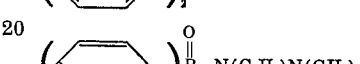 | a-91 |
| 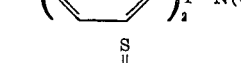 | a-92 |
| 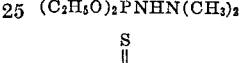 | a-93 |
| 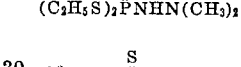 | a-94 |
| 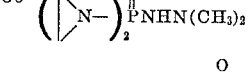 | a-95 |
| 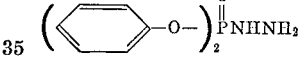 | a-96 |
| 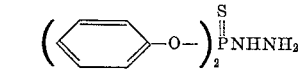 | a-97 |
| 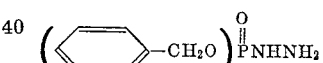 | a-98 |
| 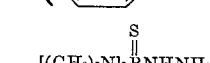 | a-99 |
| 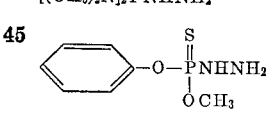 | a-100 |
| 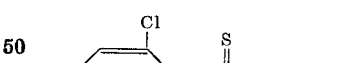 | a-101 |
| 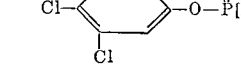 | a-102 |
| 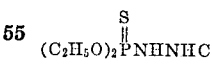 | a-103 |
| 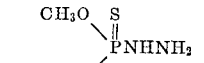 | a-104 |
| 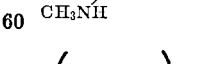 | |
|  | a-105 |

| | Abbreviation |
|---|---|
| $(CH_2=CHCH_2)_2N\overset{\overset{S}{\|}}{P}[NHN(CH_3)_2]_2$ | a-106 |
| $(CH_2=CHCH_2)_2N\overset{\overset{O}{\|}}{P}[NHN(CH_3)_2]_2$ | a-107 |
| 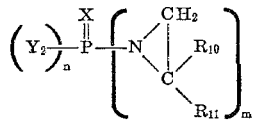 | a-108 |

The above explained compounds to be used as stabilizers in the present invention may be prepared by reacting a corresponding hydrazine or a substituted hydrazine with a corresponding halide of phosphorus in the presence of an acid acceptor. For example, a hydrazine or a substituted hydrazine is reacted with compound corresponding to the formula

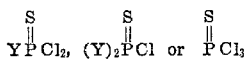

wherein Y is as defined before. Further, the compounds may also be prepared by hydrogenating the corresponding hydrazine derivatives in the presence of a noble metal catalyst.

By adding the above mentioned compound A to a urethane polymer, the gas-discoloration resistance is greatly increased. It has further been found that when a compound G to be explained hereinafter is used together with the compound A, there is obtained an effect of also greatly increasing the light-resistance of a polyurethane. It is surprising, however, that when such compound G is added alone to a urethane polymer, the light-resistance thereof will not be improved. Therefore, the compound G, if it is to be used, must be together with the compound A.

The compound G having such a great effect when used together with the above mentioned compound A is a compound represented by the following general formula G-1 or G-2.

Thus the compound G-1 is represented by the general formula:

$$\left(Y_2\right)_n\overset{\overset{X}{\|}}{P}\left[N\diagup\diagdown\overset{CH_2}{\underset{C\diagdown\diagup{R_{11}}^{R_{10}}}{}}\right]_m$$

wherein X is an atom selected from O and S, each of $R_{10}$ and $R_{11}$ is hydrogen or alkyl radical, $Y_2$ is a monovalent hydrocarbon radical or a monovalent radical consisting of hetero atom(s) or halogen atom(s) and a hydrocarbon, $n$ is 0, 1 or 2, $m$ is 1, 2 or 3 and $n+m=3$. While not critical, the alkyl is of 1–3 carbon atoms.

The radical $Y_2$ may, for example, be represented by the formula $$-Z_4, -OZ_4, -SZ_4 \text{ or } -N\diagup\diagdown{Z_5 \atop Z_6}$$

wherein $Z_4$ is a monovalent aliphatic, aromatic or alicyclic radical; a monovalent aliphatic, aromatic or alicyclic radical having hetero atom(s) in the chain; or its halogen, hydroxyl or nitro substituted radical. Each of $Z_5$ and $Z_6$ may be the same radical as $Z_4$, either of $Z_5$ and $Z_6$ may be a hydrogen atom and further each of $Z_5$ and $Z_6$ may be a radical forming a substituted or unsubstituted closed ring in conjunction with the adjacent N atom.

Examples of the radical $Y_2$ are as follows:

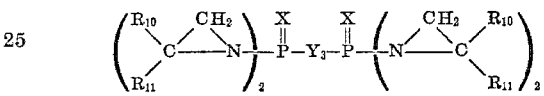

The compound G-2 is represented by the general formula:

$$\left(\overset{R_{10}}{\underset{R_{11}}{}}C\diagdown\diagup\overset{CH_2}{\underset{}{}}N-\right)_2 \overset{\overset{X}{\|}}{P}-Y_3-\overset{\overset{X}{\|}}{P}\left(-N\diagup\diagdown\overset{CH_2}{\underset{C\diagdown\diagup{R_{11}}^{R_{10}}}{}}\right)_2$$

wherein X, $R_{10}$ and $R_{11}$ are as defined before and $Y_3$ is a bivalent organic radical.

Preferably, the above radical $Y_3$ is a bivalent hydrocarbon radical or a bivalent radical consisting of hetero atom(s) or halogen atom(s) and a hydrocarbon and is represented, for example, $$\overset{N\diagup\diagdown}{\underset{\diagdown\diagup}{}}N-, \quad -Z_5-, \quad -N-Z_5-N-, \quad -OZ_5O- \text{ or } -SZ_5S-$$
$$\qquad\qquad\qquad\quad \underset{R_{12}}{|}\qquad\underset{R_{12}}{|}$$

wherein $Z_5$ is a bivalent aliphatic, aromatic or alicyclic radical; a bilavent aliphatic, aromatic or alicyclic radical having hetero atom(s) in the chain; or its halogen, hydroxyl, or nitro substituted radical; and $R_{12}$ is hydrogen, an alkyl, aryl or cycloalkyl radical; or an alkyl, aryl or cycloalkyl radical having hetero atom(s) in the chain; or its halogen, hydroxyl, or nitro substituted radical.

More particular examples of the radical $Y_3$ in the above mentioned compound G-2 are as follows:

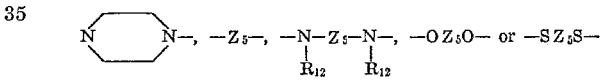

The compounds G so far explained may be modified by introducing into the same vinyl or the like radicals so that they are polymerizable to a high molecular weight compound. Further, by utilizing a reactive radical, the stabilizers can be made to react to be bonded to the terminals of a polyurethane.

Examples of the above mentioned compounds G-1 and G-2 are as follows:

| | Abbreviation |
|---|---|
| 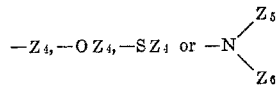 | g-1 |
| | g-2 |

| Structure | Abbreviation | Structure | Abbreviation |
|---|---|---|---|
| $\underset{CH_3}{\overset{O}{\underset{\|}{P}}}(N{<}|)_3$ with CH₃ | g-3 | $n\text{-}C_3H_7O\text{-}\overset{S}{\underset{\|}{P}}(N{<}|)_2$ | g-21 |
| $\overset{S}{\underset{\|}{P}}(\underset{C_3H_7}{N{<}})_3$ | g-4 | $iso\text{-}C_3H_7O\overset{S}{\underset{\|}{P}}(N{<}|)_2$ | g-22 |
| $C_2H_5\overset{S}{\underset{\|}{P}}(N{<}|)_2$ | g-5 | $C_2H_5O\overset{S}{\underset{\|}{P}}(\underset{}{N{<}}\overset{CH_3}{|})_2$ | g-23 |
| $C_2H_5\overset{O}{\underset{\|}{P}}(N{<}|)_2$ | g-6 | $C_4H_9O\text{-}\overset{S}{\underset{\|}{P}}(N{<}|)_2$ | g-24 |
| $C_6H_5\overset{O}{\underset{\|}{P}}(N{<}|)_2$ | g-7 | $C_6H_5\text{-}O\text{-}\overset{S}{\underset{\|}{P}}(\underset{CH_3}{N{<}\overset{CH_3}{|}})_2$ | g-25 |
| $C_6H_5\overset{S}{\underset{\|}{P}}(N{<}|)_2$ | g-8 | $C_6H_5\text{-}O\overset{S}{\underset{\|}{P}}(N{<}|)_2$ | g-26 |
| $C_4H_9\overset{O}{\underset{\|}{P}}(N{<}|)_2$ | g-9 | $C_2H_5Z\text{-}\overset{S}{\underset{\|}{P}}(N{<}|)_2$ | g-27 |
| $C_4H_9\overset{S}{\underset{\|}{P}}(N{<}|)_2$ | g-10 | $(C_2H_5)_2\text{-}N\text{-}\overset{O}{\underset{\|}{P}}(N{<}|)_2$ | g-28 |
| $ClCH_2\overset{O}{\underset{\|}{P}}(N{<}|)_2$ | g-11 | $C_6H_5\text{-}NH\overset{O}{\underset{\|}{P}}(N{<}|)_2$ | g-29 |
| $ClCH_2CH_2\overset{O}{\underset{\|}{P}}(N{<}|)_2$ | g-12 | $\underset{C_2H_5}{\overset{C_6H_5}{N}}\text{-}\overset{O}{\underset{\|}{P}}(N{<}|)_2$ | g-30 |
| $NO_2\text{-}C_6H_4\text{-}\overset{O}{\underset{\|}{P}}(N{<}|)_2$ | g-13 | $CH_3NH\overset{O}{\underset{\|}{P}}(N{<}|)_2$ | g-31 |
| $CH_2{=}CH\text{-}\overset{O}{\underset{\|}{P}}(N{<}|)_2$ | g-14 | $n\text{-}C_3H_7NH\overset{O}{\underset{\|}{P}}(N{<}|)_2$ | g-32 |
| $CH_3O\text{-}\overset{O}{\underset{\|}{P}}(N{<}|)_2$ | g-15 | $n\text{-}C_4H_9NH\overset{O}{\underset{\|}{P}}(N{<}|)_2$ | g-33 |
| $C_2H_5O\text{-}\overset{O}{\underset{\|}{P}}(N{<}|)_2$ | g-16 | piperidinyl-$\overset{O}{\underset{\|}{P}}(N{<}|)_2$ | g-34 |
| $CH_3(CH_2)_2\text{-}\overset{O}{\underset{\|}{P}}(N{<}|)_2$ | g-17 | $CH_2{=}CHCH_2NH\overset{S}{\underset{\|}{P}}(N{<}|)_2$ | g-35 |
| $C_6H_5\overset{O}{\underset{\|}{P}}(N{<}|)_2$ | g-18 | $CH_3\text{-}N\text{-piperazinyl-}\overset{S}{\underset{\|}{P}}(N{<}|)$ | g-36 |
| $NO_2\text{-}C_6H_4\text{-}\overset{O}{\underset{\|}{P}}(N{<}|)_2$ | g-19 | $CH_3OC(O)\text{-}N\text{-piperazinyl-}\overset{S}{\underset{\|}{P}}(N{<}|)$ | g-37 |
| $C_2H_5O\overset{S}{\underset{\|}{P}}(N{<}|)_2$ | g-20 | $(|{>}N)_2\overset{O}{\underset{\|}{P}}CH_2\overset{O}{\underset{\|}{P}}(N{<}|)_2$ | g-38 |

| Structure | Abbreviation |
|---|---|
| 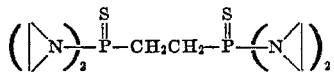 | g-39 |
| 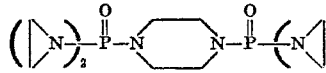 | g-40 |
| 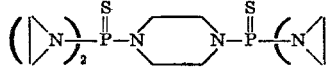 | g-41 |
| 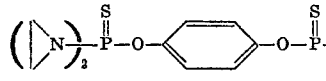 | g-42 |
| 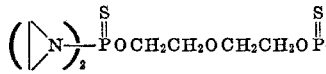 | g-43 |
| 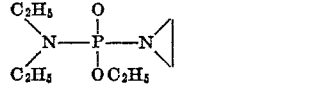 | g-44 |
| 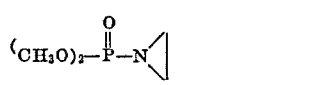 | g-45 |
| 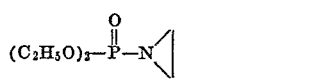 | g-46 |
| 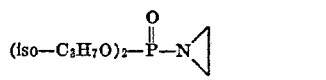 | g-47 |
| 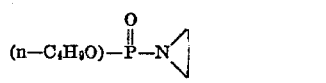 | g-48 |
| 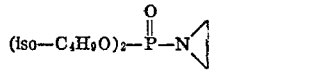 | g-49 |
| 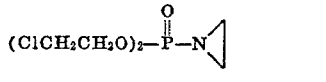 | g-50 |
| 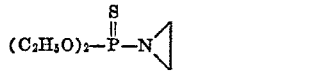 | g-51 |
| 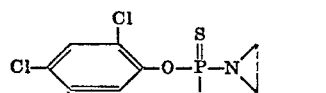 | g-52 |
| 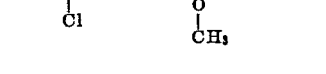 | g-53 |
| 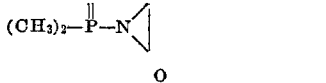 | g-54 |
| 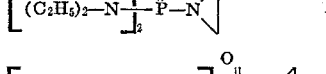 | g-55 |
| 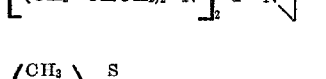 | g-56 |
| 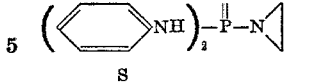 | g-57 |
| 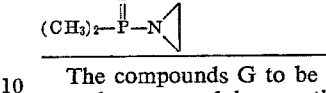 | g-58 |

The compounds G to be used in the present invention may be prepared by reacting a corresponding ethylene imine or substituted ethylene imine with a corresponding halide of phosphorus in the presence of an acid acceptor. For example, an ethylene imine or substituted ethylene imine is reacted with a compound corresponding to the formula $YP(S)Cl_2$, $Y_2P(S)Cl$ or $P(S)Cl_3$ wherein Y and $Y_2$ are as defined before.

The urethane polymer or polyurethane referred to in this specification and claims is generally a urethane polymer having a urethane linkage or urea linkage in the molecule, and may be prepared in a well known manner, for example, from an organic diisocyanate and a bifunctional active hydrogen-containing compound and also can be obtained by reacting an organic diisocyanate, a polymeric compound having two or more active hydrogen atoms at the terminals and a low molecular weight bifunctional active hydrogen-containing compound with one another in the mentioned order or simultaneously.

However, it is most preferable to apply this invention to a substantially linear polymer obtained by reacting a hydroxy-terminated polymer of a melting point below 60° C. and a molecular weight of about 500 to 6000 (for example, polyethers, polyesters, polylactones or polyester amides) with an excess amount of an organic diisocyanate and such as bifunctional active hydrogen-containing compound (for example, water, hydrazine, diamine or dihydrazide) one another simultaneously or in the mentioned order.

The composition prepared by adding the compound A or the compound A and compound G to a polyurethane may be used in preparing shaped articles such as fibers, films, etc. or as coating materials, rubbery materials and foams by the usual and well known process. It is most preferable, however, to apply the present invention in making elastic polyurethane filaments.

The stabilizer(s) of the invention may be added to the polyurethane in any state. Thus it may be added to the urethane polymer itself or to its solution or dispersion. However, it is preferable to add the stabilizer(s) to a solution of a linear urethane polymer.

In adding the stabilizer(s) to a polyurethane, it is preferable to use the same as dissolved in a solvent.

The amounts of the above mentioned stabilizer(s) to be added to a polyurethane may vary over a wide range. Generally, the compound A is in the range of 0.05 to 20%, preferably 0.1 to 8% by weight based on the urethane polymer. The compound G is added in the range of 0.5 to 20%, preferably 1 to 8% by weight based on the urethane polymer. From the economical viewpoint, it is not significant to add the stabilizer(s) in an amount larger than the mentioned above.

In order to test the gas-discoloration of a urethane polymer, a gas burner was placed in a container of a capacity of 0.5 m.³ having a circular vent hole of a diameter of 8 cm. in the upper part. A propane gas was perfectly burnt at a rate of 800 cc./minute to keep the temperature at 60° C. A film or a fiber of the urethane polymer was exposed to the combustion gas for 10 hours, at the end of which the sample was taken out and was graded. Further, as a nitrogen oxide gas-exposure test, by JIS-L-1055, the sample film was exposed to the atmosphere of the gas at 25° C. for 2 hours, at the end of which the sample was taken out and was graded.

The whiteness was determined by the method C, whiteness 12 of JIS-L-1013-5. The color of the discolored sample after the urethane polymer to which no stabilizer had been added was subjected to the exposure tests with the propane combustion gas and nitrogen oxide gas was made grade 1 while the whiteness of the untreated urethane polymer was made grade 5. The degrees of the discoloration were divided into 5 grades. Thus the grade 5 represented a non-change, grade 4 represented a slightly yellow color, grade 3 represented a yellow color, grade 2 represented a weakly yellowish brown color and grade 1 represented a yellowish brown color.

Further, the light-resistance was measured by the irradiation with Atlas-Fade-O-meter. The method of determination of the whiteness after the irradiation for 40 or 60 hours was the same as in the gas-discoloration.

The polymer composition of the present invention was not substantially discolored even after the propane combustion gas and nitrogen oxide ($NO_2$) gas-exposure tests and was nearly of grade 4 to 5. Further, in case the compound G was simultaneously used, a remarkable effect was shown also in the light-resistance and the composition was not substantially discolored and was nearly of grade 4 to 5.

Therefore, even when the urethane polymer composition of the present invention or its shaped article is exposed to the atmosphere of combustion gases such as of gas stoves or oil stoves or waste of automobiles, it does not become yellow. By adding the compound G, it is also improved in the light resistance.

If desired, known phenolic antioxidants and ultraviolet absorbers such as the alkylidene bisphenol derivatives or benzotriazoles can also be added to the polyurethane composition of this invention, so that the deterioration in the general atmospheric condition may be almost perfectly prevented.

In the present specification, unless otherwise specified, all percent and parts are by weight on the polymer.

EXAMPLE 1

1300 parts of poly(tetramethylene oxide)glycol (molecular weight; 1300) dehydrated and dried at 100° C. under 5 mm. Hg in a nitrogen atmosphere and 500 parts of methylene-bis(4-phenyl isocyanate) were reacted at 30° C. for 30 minutes to obtain a viscous high molecular weight diisocyanate (prepolymer). The prepolymer was dissolved in 3420 parts of dimethylformamide and the solution was quickly cooled to 0° C. To this solution were added slowly while stirring 74 parts of 1,2-propylene-diamine dissolved in 950 parts of dimethylformamide. With the progress of the chain extending reaction, the temperature gradually rose to about 15° C. When the viscosity of the polymer solution reached 2000 poises at 25° C., 8.76 parts of n-butylamide were added to stabilize the viscosity of the polymer solution.

To this polymer solution were added 38 parts of the stabilizer $a$–2 (melting point, 106° C.), 19 parts of Santo White Powder (a product of Monsanto Co.) and 19 parts of Tinubin 327 (a product of J. R. Geigy). To this mixture were further added 46.7 parts of a pigment paste of 60% zinc sulfide in dimethylformamide. The polymer solution was extruded into hot water at 80° C. through a spinnerette of 26 orifices of an orifice diameter of 0.09 mm. The formed filaments were taken up at a draft ratio of 1.2 and spinning velocity of 10 m./min., and were dried. The obtained elastic filaments were exposed to propane combustion gases and nitrogen oxide gases to test the discoloration.

The filaments to which the above mentioned stabilizers had not been added discolored to a dirty yellowish brown color (discoloration grade 1) but the filaments to which they had been added remained white (discoloration grade 5).

EXAMPLE 2

500 parts of a polyester glycol (glycol mol ratio 80/20, OH value 62.2, acid value 0.7, molecular weight 1785) consisting of adipic acid, 1,4-butanediol and 2,2-dimethyl-propanediol were dehydrated under 5 mm. Hg for 1 hour and were mixed with 140 parts of methylene-bis(4-phenyl-isocyanate) to react at 110° C. for 90 minutes in a nitrogen atmosphere.

The thus produced prepolymer having terminal NCO groups was dissolved in 1340 parts of dimethylformamide and the solution was quickly cooled to 0° C. Into this cold solution were slowly added 20.7 parts of 1,2-propylenediamine dissolved in 200 parts of dimethylformamide with severe stirring. When the viscosity of the solution reached 2000 poises at 25° C., 15 parts of di-n-butylamine and then about 3.2 parts of glacial acetic acid were added to stabilize the viscosity of the polymer solution. To this polymer solution were added 13.5 parts of the stabilizer $a$–54 (melting point 77° C.). Further, 16.5 parts of a pigment paste of 60% zinc sulfide in dimethylformamide were added thereto. The resulting polymer solution was extruded into hot air at 180° C. through a spinnerette of 20 orifices of an orifice diameter of 0.1 mm. and the formed filaments were wound up.

The elastic filaments thus obtained were exposed to propane combustion gases and nitrogen oxide gases to test the discoloration. The results are as follows:

Grade 5 after the propane combustion gas test.
Grade 5 after the nitrogen oxide gas test.

EXAMPLE 3

100 parts of methylene-bis(4-phenylisocyanate) and 350 parts of dimethylformamide were mixed into 250 parts of a polylactaonediol (molecular weight 1250) prepared by the addition-(polymerization) of epsilon-caprolactone by using 1,4-butanediol as an initiator. As soon as 50 p.p.m. of dibutyl tin diluarate (catalyst) were added to the mixture, heat was generated and the reaction ended in 20 minutes at 40° C. The solution was quickly cooled to 0° C. and was diluted with 265 parts of dimethylformamide. Into this cold solution were added slowly little by little 15 parts of 1,2-propylenediamine dissolved in 200 parts of dimethylformamide with severe stirring. The viscosity of the solution was controlled to be 2300 poises at 25° C. by adding a small amount of di-n-butyl amine. To the resulting solution were added 7.3 parts of the stabilizer $a$–2 (melting point 106° C.). Lastly 9.12 parts of a pigment paste of 60% zinc sulfide in dimethylformamide were added thereto. The polymer solution thus prepared was spread on a glass plate, dried at 60° C. overnight, then treated with boiling water for 1 hour and was dried. The thus obtained film was 0.05 to 1 mm. thick. The film was exposed to propane combustion gases and nitrogen oxide gases to test the discoloration. The results are as follows:

Grade 5 after the propane combustion gas test.
Grade 5 after the nitrogen oxide gas test.

EXAMPLE 4

1088 parts of a poly(tetramethylene oxide)glycol of a molecular weight of 800 were reacted with 188 parts of paraxylylene diisocyanate and 0.94 part of dibutyl tin dilaurate at 60° C. for 1.5 hours to obtain a high molecular weight glycol of a molecular weight of 2900 having terminal OH groups. This high molecular weight glycol was dissolved in 348 parts of N,N-dimethylacetamide, and the solution was cooled to 25° C. Then 348 parts of methylene-bis(4-phenylisocyanate) were added thereto to react at 40° C. for 1 hour to obtain a solution of a high molecular weight diisocyanate having terminal NCO groups and containing a free diisocyanate. Then the solution was diluted with 4613 parts of N,N-dimethylacetamide and was then cooled to 3° C. Then a solution prepared by dissolving 54.8 parts of 1,2-propylenediamine in 914 parts of N,N-dimethylacetamide was slowly added thereto with stirring to conduct a chain extending reaction. When the viscosity of the solution reached about 1500 poises at 25° C., 7.5 parts of monobutyl amine were added to stop the polymerization, and 6.0 parts of glacial acetic acid were added to stabilize the solution. To this polymer solution were added 34 parts of the stabilizer a–88 (melting point 167° C.). A transparent tough film was obtained from this solution on a glass plate. The physical properties of this film were as follows:

Breaking strength: 620 kg./cm.$^2$
Breaking elongation: 630%
Elastic recovery (after 200% elongation): 97.5%
Elastic recovery (after 300% elongation): 98.0%
Discoloration-resistance—
  After propane combustion gas test: Grade 5
  After nitrogen oxide gas test: Grade 4 to 5

A film prepared in the same manner except that the above mentioned stabilizer had not been added developed a remarkably dirty yellow color after the exposure.

EXAMPLE 5

26 parts of a poly(tetramethylene oxide)glycol of a molecular weight of 1300 and 10 parts of methylene-bis(4-phenyl isocyanate) were reacted at 80° C. for 30 minutes to obtain a prepolymer. The prepolymer was dissolved in 80 parts of dimethyl formamide and the solution was quickly cooled to 0° C. On the other hand, a solution prepared by dissolving 1.6 parts of 1,2-propylenediamine in 25 parts of dimethylformamide was added into the above mentioned cold solution with stirring. When the viscosity of the solution reached 800 poises at 25° C., 1.5 parts of the stabilizer α–87 (melting point 83 to 86° C.) were added thereto. A part of the stabilizer reacted with the remaining free isocyanate radical to form a semicarbazide bond and bonded to the polymer chain. The solution was extruded into hot water at 80° C. through a spinnerette having 20 orifices of an orifice diameter of 0.1 mm. to obtain elastic filaments.

The results of the yellowing tests of these elastic filaments are as follows:

Grade 5 after propane combustion gas test.
Grade 5 after nitrogen oxide gas test.

EXAMPLE 6

To a polymer solution prepared in the same manner as in Example 1 was added 2% by weight each of the below mentioned compounds. The solution was wet spun to obtain elastic filaments. The results of the discoloration tests of the respective elastic filaments with propane combustion gases and nitrogen oxide gases are shown in the following:

| Stabilizer | Melting point or state at the normal temperature of the stabilizer | Grade after propane combustion gas test | Grade after NO$_2$ gas test |
|---|---|---|---|
| a–1 | 161 to 164° C | 5 | 5 |
| a–2 | 106° C | 5 | 5 |
| a–9 | Pasty | 5 | 5 |
| a–15 | Solid | 5–4 | 5 |
| a–19 | Oily | 5 | 5 |
| a–20 | do | 5 | 5 |
| a–29 | do | 5 | 5 |
| a–32 | Pasty | 5 | 5 |
| a–34 | 76° C | 4 | 3 |
| a–35 | Oily | 5 | 5 |
| a–37 | Pasty | 5 | 5 |
| a–38 | do | 5 | 5–4 |
| a–42 | do | 5 | 5–4 |
| a–44 | 50 to 70° C | 5 | 4–5 |
| a–47 | 184° C | 4–3 | 3 |
| a–49 | Pasty | 4 | 4 |
| a–50 | Solid | 5 | 4 |
| a–52 | 180 to 188° C | 5 | 4 |
| a–54 | 77° C | 5 | 5 |
| a–55 | 194° C | 5–4 | 4 |
| a–56 | Solid | 5 | 5 |
| a–60 | Pasty | 5 | 5 |
| a–61 | do | 4 | 4 |
| a–74 | 115 to 117° C | 5 | 5 |
| a–75 | 96° C | 5 | 5 |
| a–76 | 131° C | 4 | 4 |
| a–77 | 101° C | 4 | 4 |
| a–78 | 76° C | 5 | 5 |
| a–79 | 82 to 84° C | 5 | 5 |
| a–81 | 108 to 110° C | 4 | 3 |
| a–82 | 134 to 136° C | 5 | 5 |
| a–83 | 104 to 105° C | 5 | 4 |
| a–86 | 96° C | 5 | 5 |
| a–87 | 83 to 86° C | 5 | 4 |
| a–88 | 167° C | 5 | 5 |
| a–90 | Solid | 5 | 5–4 |
| a–91 | 166° C | 5 | 4–5 |
| a–92 | 141° C | 5 | 4–5 |
| a–93 | Oily | 5 | 4 |
| a–94 | do | 4 | 4 |
| a–95 | Solid | 3–4 | 4 |
| a–96 | 113° C | 4 | 4 |
| a–97 | 63° C | 5 | 4–5 |
| a–98 | 73° C | 4 | 4 |
| a–99 | 41° C | 5 | 4–5 |
| a–100 | Pasty | 5 | 4 |
| a–101 | 115° C | 5 | 5 |
| a–102 | Oily | 5 | 4 |
| a–103 | do | 5 | 4 |

EXAMPLE 7

2000 parts of a dried (tetramethylene oxide)glycol of a molecular weight of 1000 were reacted with 174 parts of 2,4-toluene diisocyanate at 80 to 85° C. for about 3 hours to obtain a low molecular weight polymer having terminal hydroxyl radicals and having an average of two poly(tetramethylene oxide) per molecule. Then the product was reacted with 500 parts of methylene-bis-(4-phenyl isocyanate) at 80 to 85° C. for 1 hour. The resulting high molecular weight diisocyanate was dissolved in 5700 parts of dimethylacetamide and the solution was quickly cooled to 0° C. on an ice bath. To this cold solution were slowly added, while stirring, 74 parts of 1,2-propylenediamine dissolved in 700 parts of dimethylacetamide. When the viscosity of the polymer solution reached about 2000 poises at 25° C., 10.2 parts of di-n-butylamine were added thereto. Then, 96.2 parts of zinc sulfide were added.

To this polymer solution were added 128 parts of the stabilizer a–2 (melting point 106° C.) and 128 parts of the stabilizer g–43 (pasty), and the solution was dry-spun to obtain filaments of 210 deniers. The resulting elastic filaments were exposed to propane combustion gases, nitrogen oxide gases and a Fade-O-Meter to test the discoloration degrees.

In the respective tests, the filaments to which the above mentioned stabilizers had not been added discolored to a dirty yellowish brown color (discoloration grade 1) but the filaments to which the stabilizers had been added were of grade 5.

EXAMPLE 8

46.7 parts of a pigment paste of 60% zinc sulfide in dimethylformamide were added to a polymer solution which had been obtained by the same process as in Example 1. A part of this polymer solution was taken out, and 2% by weight of each of the stabilizers shown in the following table was added. Then the polymer solution was spun into hot water at 80° C. through a spinnerette having 26 orifices of an orifice diameter of 0.09 mm. at a draft rate of 1.2 times and a spinning velocity of 10 m./min. The formed elastic filaments were dried and then their discoloration was tested with propane combustion gases, nitrogen oxide gases and a Fade-O-Meter.

| Stabilizer | M.P. or B.P. (° C./mm. Hg) of the stabilizer | Fade-O-Meter (40 hours) | Propane combustion gas | | NO₂ gas (2 hours) |
|---|---|---|---|---|---|
| | | | 5 hours | 10 hours | |
| None¹ | | 1 | 1 | | 1 |
| a-1 | M.P. 162 | 3 | 5 | 5 | 5 |
| a-2 | M.P. 106 | 4 | 5 | 5 | 5 |
| a-74 | M.P. 115 | 2 | 5 | 5 | 5 |
| g-24 | B.P. 113-115/0.2 | 3-4 | 3 | 2 | 3 |
| g-25 | M.P. 64 | 3-4 | 3 | 2 | 3 |
| g-38 | M.P. 135-136 | 3-4 | 3 | 2 | 3 |
| g-43 | Pasty | 3-4 | 3 | 2 | 3 |
| a-2 / b-20 | M.P. 106 / B.P. 90-91/0.2 | 5 | 5 | 5 | 5 |
| v-2 / g-41 | M.P. 106 / M.P. 203 | 5 | 5 | 5 | 5 |
| a-86 / g-43 | M.P. 96 / Pasty | 5 | 5 | 5 | 5 |
| a-86 / g-53 | M.P. 96 / B.P. 60/1 | 5 | 5 | 5 | 5 |
| a-54 / g-38 | M.P. 77 / M.P. 135-136 | 5 | 5 | 5 | 5 |
| a-74 / g-26 | M.P. 115 / B.P. 85/0.008 | 5 | 5 | 5 | 5 |
| a-2 / g-24 | M.P. 106 / B.P. 113-115/0.2 | 5 | 5 | 5 | 5 |
| a-86 / g-23 | M.P. 96 / B.P. 40/0.07 | 5 | 5 | 5 | 5 |
| a-86 / g-25 | M.P. 96 / M.P. 64 | 5 | 5 | 5 | 5 |

¹ Not added.

What we claim is:

1. A stabilized composition which comprises a combustion gas stabilizing amount of a compound of the formula

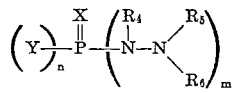

wherein X is O or S, R₄ is hydrogen or a monovalent hydrocarbon radical having 1-7 carbon atoms, each of R₅ and R₆ is hydrogen or a monovalent aliphatic, alicyclic or aromatic radical having 1-20 carbon atoms, or R₅ and R₆ together with the nitrogen atom form a closed ring, and Y is a radical represented by the formula

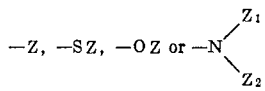

wherein Z is a monovalent aliphatic, aromatic or alicyclic radical of 1-8 carbon atoms and is unsubstituted or substituted with hydroxyl, nitro or halogen atoms, each of Z₁ and Z₂ are hydrogen atoms, or the same as Z above, or together with the adjacent nitrogen atom form a closed ring, n is 0, 1 or 2, m is 1, 2 or 3 and n+m=3, and a linear polyurethane subject to discoloration by combustion gases.

2. A composition according to claim 1 wherein the said compound is present in an amount of 0.01 to 20% by weight based on the urethane polymer and the linear polyurethane is one obtained by reacting a hydroxy-terminated polymer of a melting point below 60° C. and a molecular weight of about 500 to 6000 with an excess amount of an organic diisocyanate and a bifunctional active hydrogen-containing compound.

3. A composition according to claim 1 wherein the urethane polymer is elastic.

4. A composition as claimed in claim 1 which further comprises a stabilizing amount of a compound of the general formula,

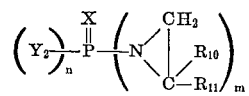

wherein X is O or S, each of R₁₀ and R₁₁ is hydrogen or an alkyl radical of 1-3 carbon atoms, Y₂ is a monovalent aliphatic, alicyclic or aromatic radical of 1-8 carbon atoms and is unsubstituted or substituted with nitro or halogen atoms, n is 0, 1 or 2, m is 1, 2 or 3 and n+m is 3.

5. A composition according to claim 1, which further compirses a stabilizing amount of a compound represented by the general formula:

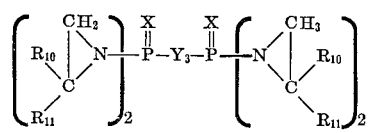

wherein X is O or S, each of R₁₀ and R₁₁ is hydrogen or an alkyl radical of 1-3 carbon atoms, and Y₃ is a bivalent organic radical selected from the group consisting of

—CH₂CH₂—, —CH₂CH₂CH₂—, —CH₂CH₂CH₂CH₂—
NHCH₂CH₂NH—, —NHCH₂CH₂OCH₂CH₂NH—

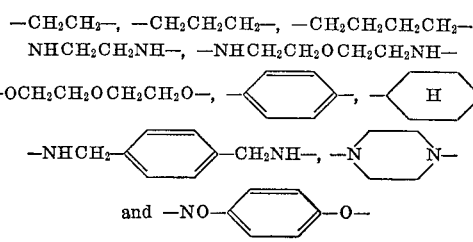

6. A stabilized composition which comprises a combustion gas stabilizing amount of a compound of the formula

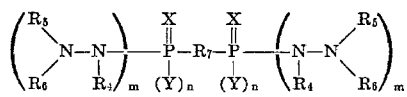

wherein X is O or S, $R_4$ is hydrogen or a monovalent aliphatic hydrocarbon radical of 1–7 carbon atoms, each of $R_5$ and $R_6$ is hydrogen or a monovalent aliphatic, alicyclic or aromatic radical having 1 to 20 carbon atoms, or $R_5$ and $R_6$ together, with the adjacent N atom form a closed ring, Y is a radical represented by the formula

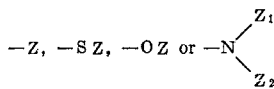

wherein Z is a monovalent aliphatic, aromatic or alicyclic radical of 1–8 carbon atoms and is unsubstituted or substituted with hydroxyl, nitro or halogen atoms, each of $Z_1$ and $Z_2$ is a monovalent aliphatic hydrocarbon, or $Z_1$ and $Z_2$ together with the adjacent N atom form a closed ring; and $R_7$ is a radical represented by the formula

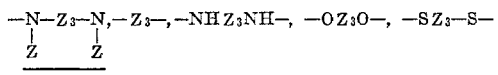

or

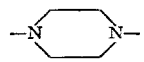

wherein $Z_3$ is a bivalent aliphatic, aromatic or alicyclic radical having 2–6 carbon atoms, and Z is a monovalent aliphatic, aromtic or alicyclic radical, n is 0 or 1, m is 1 or 2 and $n+m$ is 2, and a linear polyurethane subject to discoloration by combustion gases.

7. A composition according to claim 6 wherein the said compound is present in an amount of 0.01 to 20% by weight based on the urethane polymer and the linear polyurethane is one obtained by reacting a hydroxy-terminated polymer of a melting point below 60° C. and a molecular weight of about 500 to 6000 with an excess amount of an organic diisocyanate and a bifunctional active hydrogen-containing compound.

8. A composition according to claim 6 wherein the urethane polymer is elastic.

9. A composition as claimed in claim 6 which further comprises a stabilizing amount of a compound of the general formula

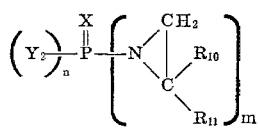

wherein X is O or S, each of $R_{10}$ and $R_{11}$ is hydrogen or an alkyl radical of 1–3 carbon atoms, $Y_2$ is a monovalent aliphatic, alicyclic or aromatic radical of 1–8 carbon atoms and is unsubstituted or substituted with nitro or halogen atoms, n is 0, 1 or 2, m is 1, 2 or 3 and $n+m$ is 3.

10. A composition according to claim 6, which further comprises a stabilizing amount of a compound represented by the general formula

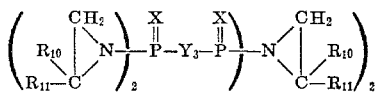

wherein X is O or S, each of $R_{10}$ and $R_{11}$ is hydrogen or an alkyl radical of 1–3 carbon atoms, and $Y_3$ is a bivalent organic radical selected from the group consisting of

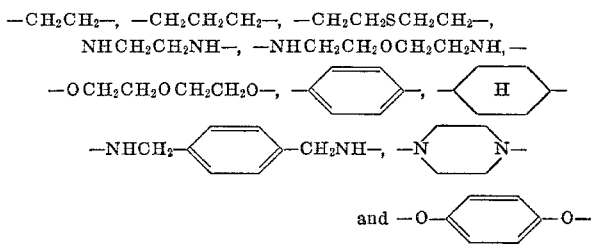

References Cited

UNITED STATES PATENTS

| | | | |
|---|---|---|---|
| 2,906,770 | 9/1959 | Debo | 260—923 |
| 3,107,231 | 10/1963 | Malz et al. | 260—45.9 |
| 3,280,221 | 10/1966 | Skovromek | 260—923 |
| 3,260,702 | 7/1966 | Murakami et al. | |

FOREIGN PATENTS

| | | | |
|---|---|---|---|
| 1,048,917 | 1/1959 | Germany | 260—923 |

DONALD E. CZAJA, Primary Examiner

H. S. COCKERAM, Assistant Examiner

U.S. Cl. X.R.

260—45.8 N, 77.5 SS